United States Patent [19]

Yoshio et al.

[11] Patent Number: 5,681,669
[45] Date of Patent: Oct. 28, 1997

[54] ELECTROLYTE FOR LITHIUM SECONDARY BATTERY

[75] Inventors: Masaki Yoshio, Saga; Hiroyoshi Nakamura, Yame; Hideya Yoshitake, Tokyo; Shuji Tanaka, Ube, all of Japan

[73] Assignee: Ube Industries, Ltd., Ube, Japan

[21] Appl. No.: 627,023

[22] Filed: Apr. 3, 1996

[30] Foreign Application Priority Data

Apr. 4, 1995 [JP] Japan .................................. 7-078767

[51] Int. Cl.$^6$ ................................................. H01M 6/14
[52] U.S. Cl. .......................... 429/194; 429/197; 252/62.2
[58] Field of Search ................................. 429/194, 197; 252/62.2, 500, 518

[56] References Cited

FOREIGN PATENT DOCUMENTS

| 52-109116 | 9/1977 | Japan . |
| 57-118375 | 7/1982 | Japan . |
| 2148665 | 6/1990 | Japan . |
| 4171674 | 6/1992 | Japan . |

*Primary Examiner*—Bruce F. Bell
*Attorney, Agent, or Firm*—Burgess, Ryan & Wayne

[57] ABSTRACT

An electrolyte for a lithium secondary battery comprising an organic solvent containing an aromatic carbonate and a lithium salt dissolved in the organic solvent.

8 Claims, 3 Drawing Sheets

ELECTROLYTE FOR LITHIUM SECONDARY BATTERY

BACKGROUND OF THE INVENTION

1. Field of the Invention

The present invention relates to an electrolyte for a lithium secondary battery. More specifically, it relates to an electrolyte for a lithium metal secondary battery and an electrolyte suitable for use as an electrolyte for a lithium ion secondary battery.

2. Description of the Related Art

Lithium secondary batteries have rapidly been spreading in use in recent years, but still have problems such as the inability to obtain a good cycle life. Accordingly, there has been a demand for development of an electrolyte with excellent cycle characteristics such as charging and discharging efficiency and cycle life and with excellent low-temperature performance.

As the organic solvent conventionally used for the electrolyte of a lithium secondary battery, a mixed solvent of a low viscosity solvent and a high dielectric constant solvent such as propylene carbonate (PC) is used. This is because the charging and discharging efficiency is low when only a low viscosity solvent is used. Examples of such a mixed solvent are a mixed solvent of PC and 1,2-dimethoxyethane (DME). Further, it has been proposed to use a mixed solvent of PC and benzene or toluene (see Japanese Unexamined Patent Publication (Kokai) No. 52-109116), a mixed solvent of PC and tetrahydrofuran (see Japanese Unexamined Patent Publication (Kokai) No. 57-118375), a mixed solvent of PC and dimethylcarbonate (DMC) or diethylcarbonate (DEC) (see Japanese Unexamined Patent Publication (Kokai) No. 2-148665 and Japanese Unexamined Patent Publication (Kokai) No. 4-171674), etc.

However, when such mixed solvents are used as the solvent component for an electrolyte, in the case of a lithium metal battery using lithium as the anode active material, a reaction occurs between the electrolyte and anode active material at the anode side or the potential is kept at a high voltage at the cathode side, whereby problems occur such that the electrolyte is likely to be decomposed at the anode and cathode and good cycle characteristics cannot be obtained.

On the other hand, in the case of a lithium ion battery using a carbonous material, for example, graphite, as the anode active material, the PC decomposes during charging, and therefore, not only good cycle characteristics cannot be obtained, but also there is a greater risk of explosion etc. due to the existence of the decomposition products in the battery. Accordingly, ethylene carbonate (EC) is used, instead of PC, but if EC (melting point of 37°–39° C.) is used, the problem arises of poor low-temperature performance of the battery. To keep good cycle characteristics and low-temperature performance, it is preferable to use PC, but at the present it is difficult to suppress the decomposition of PC so as to use PC.

As explained above, the conventional electrolyte for a lithium secondary battery was not satisfactory in terms of the stability of the propylene carbonate (PC) or other electrolyte or cycle life or other cycle characteristics in both lithium metal batteries and lithium ion batteries.

SUMMARY OF INVENTION

Accordingly, the object of the present invention is to provide an electrolyte for a lithium secondary battery which is superior as an electrolyte for a lithium secondary battery which is superior in PC stability and which is superior in cycle characteristics such as cycle life, particularly even as an electrolyte for a lithium metal secondary battery or as an electrolyte for a lithium ion secondary battery, particularly a lithium ion secondary battery using graphite as the anode active material.

In accordance with the present invention, there is provided an electrolyte for a lithium secondary battery comprising an organic solvent containing an aromatic carbonate and a lithium salt dissolved in the organic solvent.

BRIEF DESCRIPTION OF THE DRAWINGS

The present invention will now be explained with reference to the accompanying drawings wherein.

DETAILED DESCRIPTION OF PREFERRED EMBODIMENTS

Figure 1:
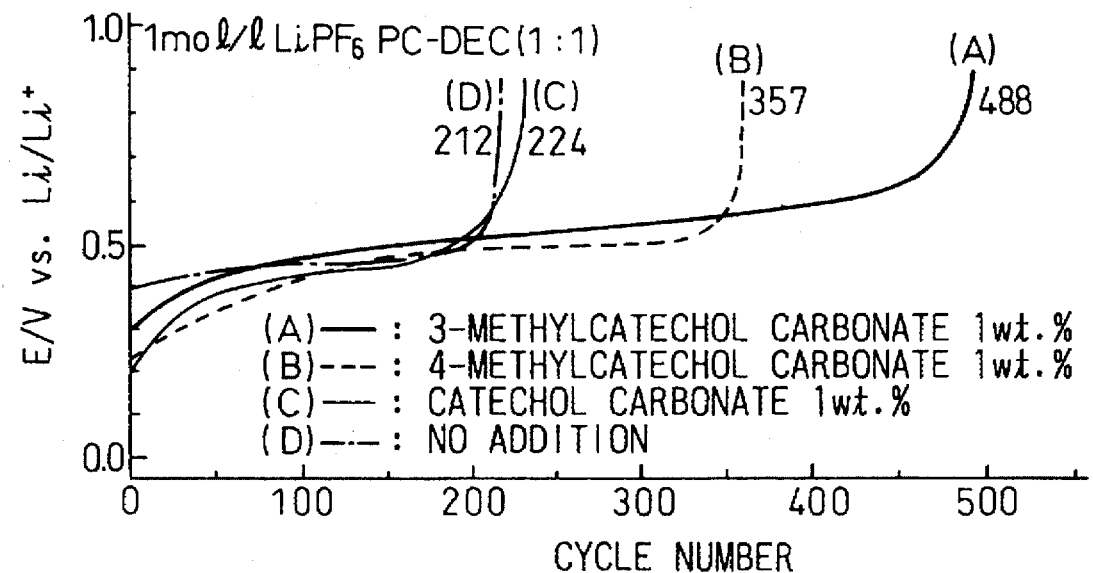
FIG. 1 shows the cycle characteristics of a lithium electrode when adding catechol carbonate.

The present invention will be explained in more detail below.

The electrolyte for a lithium secondary battery is composed of mixed organic solvents comprising at least a high dielectric constant solvent and a low viscosity solvent and a solute comprising a lithium salt.

Examples of the high dielectric constant solvent are cyclic carbonates of 2 to 4 carbon atoms (however, not including carbonyl carbon) such as ethylene carbonate (EC), propylene carbonate (PC), butylene carbonate (BC).

Examples of the low viscosity solvent are chain carbonates having 2 to 8 carbon atoms (however, not including carbonyl carbon) such as dimethyl carbonate (DMC), diethyl carbonate (DEC), dipropyl carbonate (DPC), and methylethyl carbonate (MEC); chain ethers such as 1,2-dimethoxyethane (DME), 1,2-diethoxyethane (DEE), and 1,2-dibutoxyethane (DBE); cyclic ethers such as tetrahydrofuran and 2-methyltetrahydrofuran (THF), esters such as methyl formate, methyl acetate, and methyl propionate; and aromatic hydrocarbons such as benzene (Bz), toluene, and xylene.

These high dielectric constant solvents and low viscosity solvents may be used alone or in any combination thereof.

Examples of combinations of the high dielectric constant solvent and low viscosity solvent are two-component solvent systems such as EC-DMC, EC-DEC, PC-DMC, PC-DEC, and PC-MEC, three-component solvent systems such as EC-DMC-Bz, EC-DEC-Bz, PC-DMC-Bz, PC-DEC-Bz, EC-PC-DMC, and EC-PC-DEC, and four-component solvent systems such as EC-PC-DMC-Bz and EC-PC-DEC-Bz. Note that the high dielectric constant solvent and the low viscosity solvent are used in a ratio of the high dielectric constant solvent to low viscosity solvent (ratio by volume) of preferably 1:4 to 2:1, more preferably 1:2 to 1:1.

Examples of the lithium salt are inorganic salts such as $LiPF_6$, $LiCLO_4$, $LiAsF_6$, $LiBF_4$, $LiAlCl_4$, LiCl, and LiBr and organic salts such as $CH_3SO_3Li$, $CF_3SO_3Li$, $LiB(C_6H_5)_4$, and $CF_3COOLi$. These lithium salts may be used alone or in any combination thereof and are dissolved in the above-mentioned organic solvent at a concentration of preferably 0.5 to 3M, more preferably 1 to 1.5M.

Examples of the aromatic carbonate contained in the solvent component are (1) unsubstituted catechol carbonates, (2) substituted catechol carbonates having alkyl groups of 1 to 4 carbon atoms as substituted groups on the aromatic nucleus such as 3-methyl catechol carbonate, 4-methyl catechol carbonate, 3-ethyl catechol carbonate, 4-ethyl catechol carbonate, 3-n-propyl catechol carbonate, 4-n-propyl catechol carbonate, 4-i-propyl catechol carbonate, and 4-t-butyl catechol carbonate, and (3) alkyl phenyl carbonates having, in the ester portion, alkyl groups of 1 to 4 carbon atoms such as methyl phenyl carbonate and ethyl phenyl carbonate. These aromatic carbonates may be used alone or in any combination thereof, but among the aromatic carbonates, catechol carbonates, that is, unsubstituted catechol carbonates and substituted catechol carbonates, are particularly preferably used. Note that the amount of the aromatic carbonate contained in the organic solvent of the electrolyte is preferably 0.1 to 10% by weight, more preferably 2 to 5% by weight.

Note that the above-mentioned catechol carbonate can be easily prepared by reacting substituted or unsubstituted catechol with a carbonate ester.

The electrolyte containing an aromatic carbonate according to the present invention may be preferably used as an electrolyte of a usual lithium metal secondary battery.

As the configuration of the lithium metal secondary battery, the cathode active material may be selected from (1) polymer conductors such as polyaniline, polyacetylene, poly-p-phenylene, polybenzene, polypyridine, polythiophene, polyfuran, polypyrrol, anthracene, polynapthtalene, and the derivatives thereof, (2) metal oxides such as manganese dioxide, vanadium pentoxide, molybdenum trioxide, chromium trioxide, and cupric oxide, $LiCoO_2$, $LiNiO_2$, $LiMn_2O_4$, (3) metal sulfides such as molybdenum disulfide, titanium disulfide, and ferrous disulfide, and (4) fluorocarbons. Further, the anode active material is selected from (1) lithium and (2) a lithium alloy. Note that examples of the lithium alloy are an alloy of lithium and at least one metal selected from aluminum, magnesium, indium, mercury, zinc, cadmium, lead, bismuth, tin, and antimony.

Further, the electrolyte containing an aromatic carbonate according to the present invention may be preferably used as an electrolyte for a lithium ion secondary battery, particularly, an electrolyte for a lithium ion secondary battery using graphite as the anode active material.

For the composition of the lithium ion secondary battery, the conventional composition of a lithium ion battery may be used. Examples of the cathode active material are a lithium composite metal oxide having the general formula $Li_p(MO)_q$ (wherein, M is at least one metal selected from cobalt, nickel, and manganese and p and q are integers satisfying the atomic values) and interlayer compounds containing lithium.

As the carbonous material of the anode active material, any material conventionally used for a lithium secondary battery may be used. Examples of such materials are (a) graphite or (b) a carbon material obtained by sintering and carbonizing an organic material selected from (1) a conjugate resin such as a phenol resin, acrylic resin, polyimide resin, or polyamide resin, (2) a condensed polycyclic hydrocarbon compound such as naphthalene, phenanthroline, or anthracene, (3) a furan resin comprising a homopolymer or copolymer of furfuryl alcohol or furfural, and (4) oxygen cross-linked petroleum pitch. Among these carbonous materials, graphite is particularly preferably used. Note that graphite and the above-mentioned carbon materials may be used alone or in any mixture thereof.

EXAMPLES

The present invention will now be further explained in detail, but is by no means limited to, the following Examples and Comparative Examples.

Reference Example

One mol of catechol, 1 mol of dimethyl carbonate and 2.5 mmol of sodium methoxide were charged into 500 ml glass reactor and the mixture was reacted for 40 hours by heating the liquid temperature to 117°–128° C. During the reaction, the formed methanol was removed to the outside of system by vaporizing as an azeotropic mixture of methanol-dimethyl carbonate, while about 0.6 mol of dimethyl carbonate removed as an azeotropic mixture was additionally supplied to the reactor.

After completing the reaction, the resultant reaction mixture was concentrated and the concentrate was neutralized by adding 0.1N sulfuric acid in an amount approximately equivalent to the sodium methoxide. The neutralized product was washed with water and, after azeotropically dehydrating with the addition of dimethyl carbonate, the catechol carbonate was separated by reduced distillation (134° C./53 mmHg). The yield was 65.7%. The other substituted catechol carbonates were prepared in the same manner.

Example 1

1.0% by weight of 3-methyl catechol carbonate was dissolved in an organic solvent obtained by mixing propylene carbonate (PC) and diethyl carbonate (DEC) in a ratio by volume of PC:DEC of 1:1 and $LiPF_6$ was dissolved to a concentration of 1M to prepare the electrolyte. In this electrolyte, lithium foil (thickness of 0.07 mm) was immersed as the working electrode and lithium foil (thickness of 0.2 mm) was immersed as the counter electrode in a facing state, lithium was immersed as a reference electrode between the two electrodes, then a charging and discharging cycle was repeated in which the lithium was made to electrodeposit on the working electrode for 500 seconds at a constant current of 2.0 $mA/cm^2$ for charging, then the lithium was made to anodically dissolve for 500 seconds by a constant current of 2.0 $mA/cm^2$. As the working electrode, lithium metal (1×1 cm) having a constant thickness, as the reference electrode, lithium metal and, as the counter, an electrode lithium metal flake having a thickness about 12 times thicker than that of the working electrode were used and the working electrode was repeatedly electrodeposited and dissolved by changing the polarity at the constant time cycle (i.e., 500s). By this repetition, Li on the working electrode was lost during the repeated electrodeposition and anodic dissolution of lithium. Finally, anodic potential of the working electrode was increased at 1.0V or more. Anodic potential of being 1.0V or more was defined as the cycle life. As a result, the cycle number was 488 as shown in FIG. 1-(A).

Example 2

The charging and discharging cycle was repeated and the cycle number measured in the same way as in Example 1, except that, instead of the 3-methyl catechol carbonate in Example 1, 1.0% by weight of 4-methyl catechol carbonate was dissolved. As a result, the cycle number was 357 as shown in FIG. 1-(B).

Example 3

The charging and discharging cycle was repeated and the cycle number measured in the same way as in Example 1, except that, instead of the 3-methyl catechol carbonate in Example 1, 1.0% by weight of catechol carbonate was dissolved. As a result, the cycle number was 224 as shown in FIG. 1-(C).

Comparative Example 1

The charging and discharging cycle was repeated and the cycle number measured in the same way as in Example 1, except that the 3-methyl catechol carbonate in Example 1 was not added. As a result, the cycle number was 212 as shown in FIG. 1-(D).

Example 4

Figure 2:
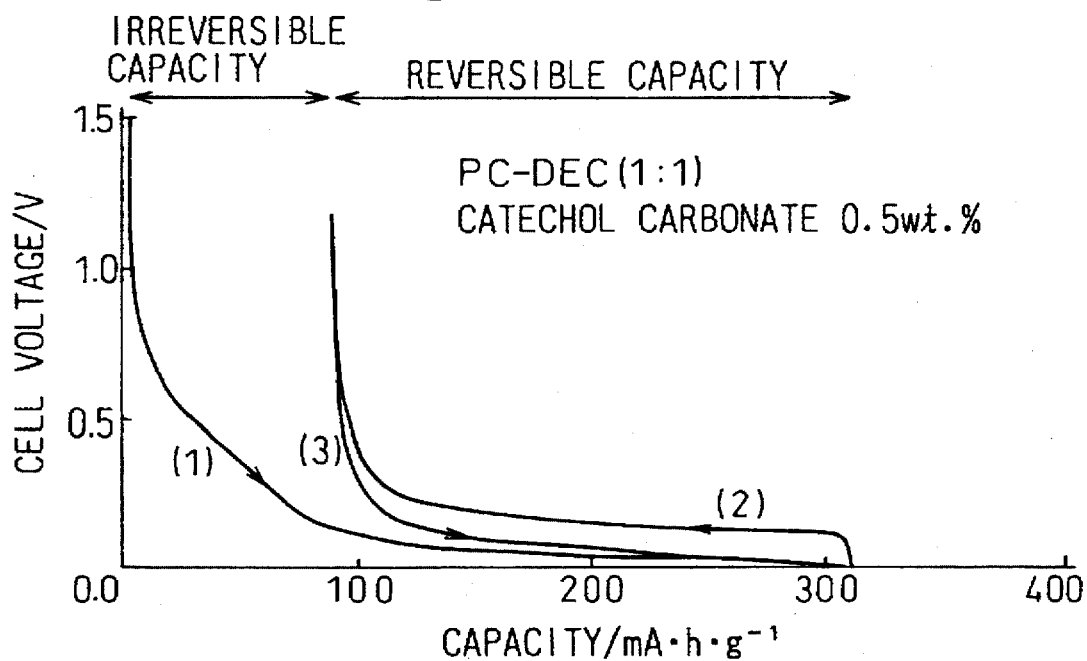
FIG. 2 shows curves of charging and discharging of a graphite electrode in the presence of 0.5% by weight of catechol carbonate in which (1) represents a first intercalation process of lithium ion into a graphite anode (i.e., first charging process), (2) represents a first deintercalation process of lithium ion from the graphite anode (i.e., first discharge process) and (3) represents a second intercalation process of lithium ion into a graphite anode (i.e., second charging process) (Note: these are the same as in the following drawings)

0.5% by weight of catechol carbonate was dissolved in an organic solvent obtained by mixing propylene carbonate (PC) and diethyl carbonate (DEC) in a ratio by volume of PC:DEC of 1:1 and $LiPF_6$ was dissolved to a concentration of 1 mol/liter to prepare the electrolyte. In this electrolyte, graphite was inserted as the working electrode and lithium foil as the counter electrode and the charging and discharging characteristics were measured at a range of voltage of 1.0V to 0.001V at a constant current of 0.4 mA/cm$^2$. As a result, as shown in FIG. 2-(1), no level potential due to the decomposition of PC such as seen at 0.5 to 0.8V was observed.

Example 5

Figure 3:
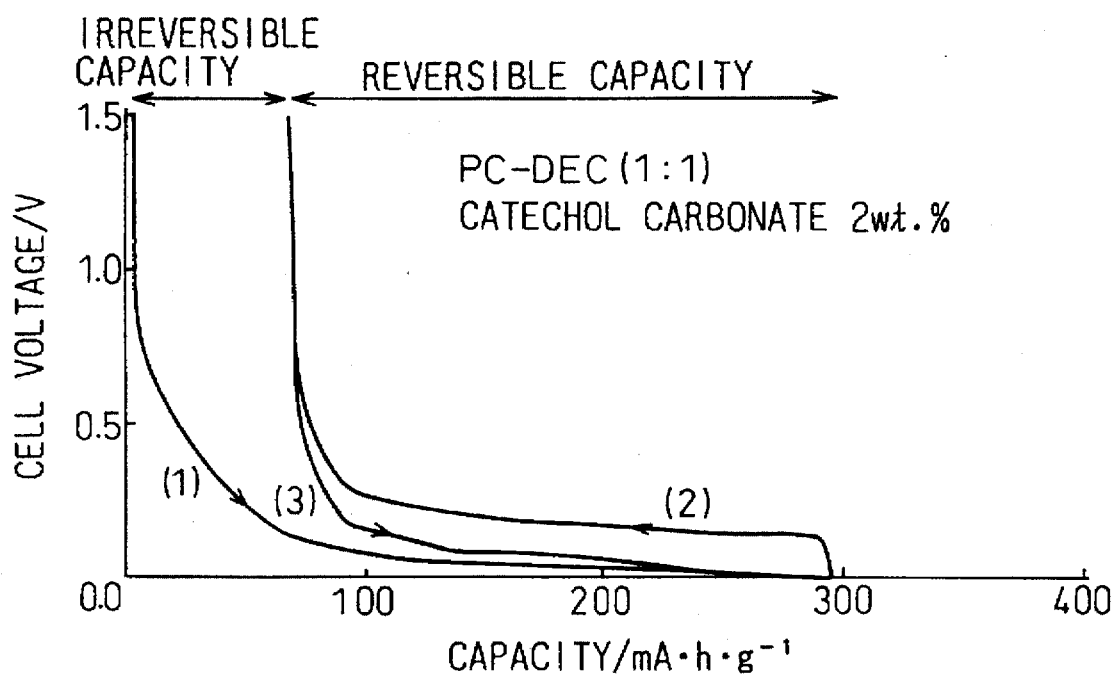
FIG. 3 shows curves of charging and discharging of a graphite electrode in the presence of 2.0% by weight of catechol carbonate.

The charging and discharging characteristics were measured in the same way as in Example 5, except that 2.0% by weight of the catechol carbonate in Example 4 was dissolved. As a result, as shown in FIG. 3-(1), no potential due to the decomposition of PC was observed and the irreversible volume was reduced.

Comparative Example 2

Figure 4:
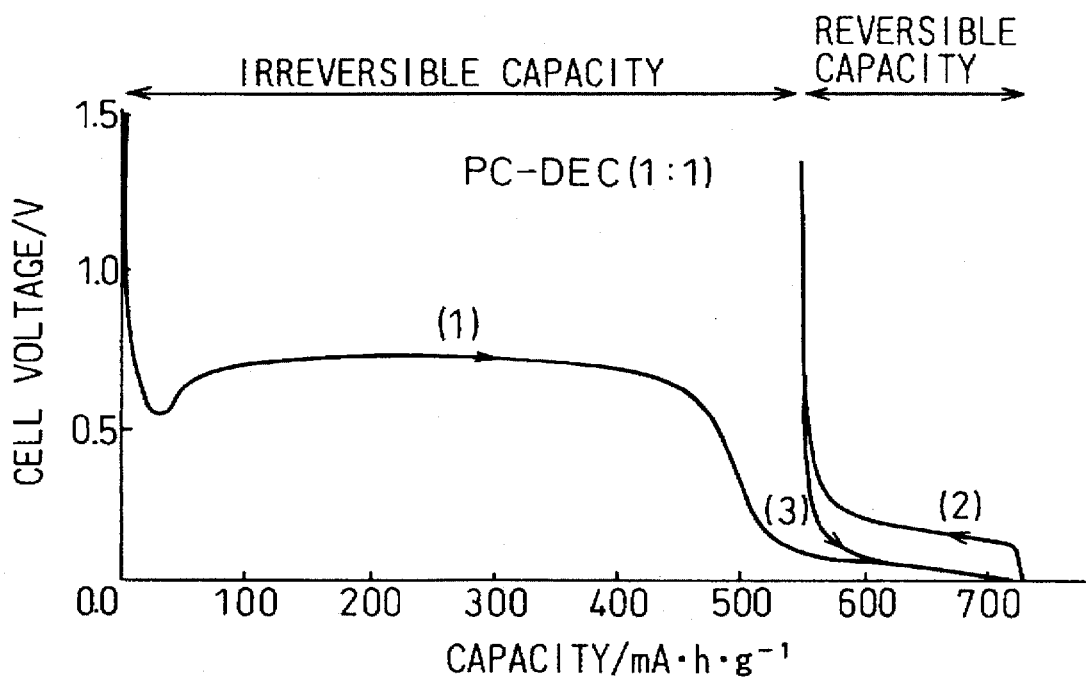
FIG. 4 shows curves of charging and discharging of a graphite electrode in the absence of catechol carbonate.

The charging and discharging characteristics were measured in the same way as in Example 5, except that no catechol carbonate in Example 5 was added. As a result, as shown in FIG. 4-(1), the PC was decomposed near at 0.7V voltage plateau region.

Example 6

Figure 5:
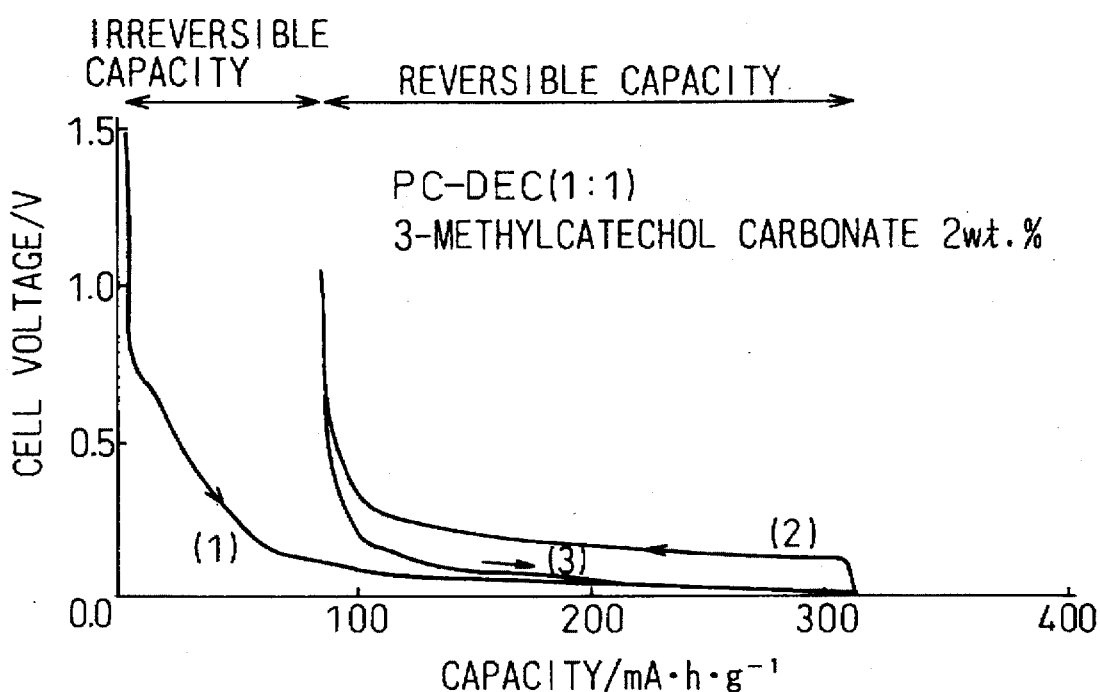
FIG. 5 shows curves of charging and discharging of a graphite electrode in the presence of 3-methyl catechol carbonate.

The charging and discharging characteristics were measured in the same way as in Example 5, except that 2.0% by weight of 3-methyl catechol carbonate instead of the catechol carbonate in Example 5 was dissolved. As a result, as shown in FIG. 5-(1), no plateau due to the decomposition of PC was observed.

Example 7

Figure 6:
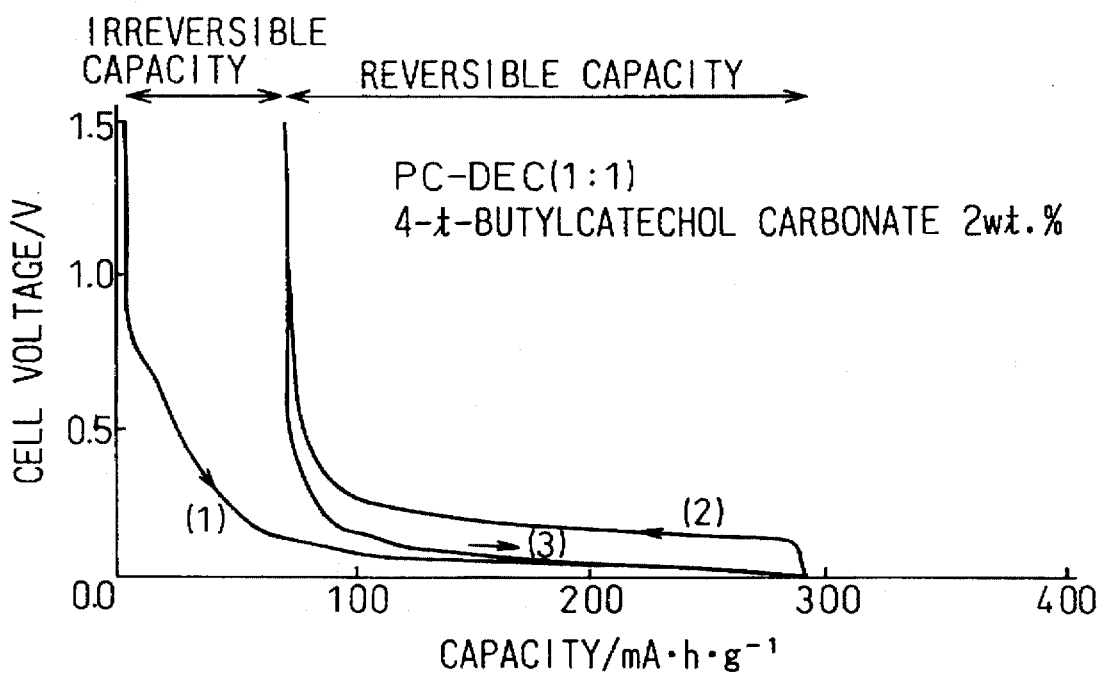
FIG. 6 shows the curves of charging and discharging of a graphite electrode in the presence of 4-t-butylcatechol carbonate.

The charging and discharging characteristics were measured in the same way as in Example 5, except that, instead of the catechol carbonate in Example 5, 2.0% by weight of 4-t-butyl catechol carbonate was dissolved. As a result, as shown in FIG. 6-(1), no potential due to decomposition of PC was observed.

The electrolyte for a lithium secondary battery containing an aromatic carbonate as an organic solvent suppresses the decomposition of the electrolyte using lithium as the anode active material in a secondary lithium metal battery, and therefore, can construct a secondary battery having excellent cycle characteristics, further, can suppress the decomposition of the PC and construct a secondary battery having excellent cycle characteristics even in a lithium ion battery using a carbonous material for the anode active material. In particular, in a lithium ion secondary battery using graphite as the anode active material, the electrolyte of the present invention can suppress the decomposition of PC and reduces the irreversible capacity, so can construct a battery which is excellent in low-temperature performance and large in battery capacity.

We claim:

1. An electrolyte for a lithium secondary battery comprising an organic solvent containing an aromatic carbonate and a lithium salt dissolved in the organic solvent.

2. An electrolyte for a lithium secondary battery as claimed in claim 1, wherein the lithium salt is at least one compound selected from the group consisting of inorganic salts and organic salts.

3. An electrolyte for a lithium secondary battery as claimed in claim 2, wherein the organic salts are $CH_3SO_3Li$, $CF_3SO_3Li$, $LiB(C_6H_5)_4$ and $CF_3COOLi$.

4. An electrolyte for a lithium secondary battery as claimed in claim 2, wherein the inorganic salts are $LiPF_6$, $LiClO_4$, $LiAsF_6$, $LiBF_4$, $LiAlCl_4$, $LiCl$ and $LiBr$.

5. An electrolyte for a lithium secondary battery as claimed in claim 1, wherein the concentration of the lithium salt in the organic solvent is 0.5 to 3M.

6. An electrolyte for a lithium secondary battery as claimed in claim 1, wherein the aromatic carbonate is at least one compound selected from the group consisting of unsubstituted catechol carbonates, substituted catechol carbonates having at least one $C_1$-$C_4$ alkyl group and alkyl phenyl carbonates having at least one $C_1$-$C_4$ alkyl group in the ester portion thereof.

7. An electrolyte for a lithium secondary battery as claimed in claim 1, wherein the concentration of the aromatic carbonate in the organic solvent is 0.1 to 10% by weight.

8. An electrolyte for a lithium secondary battery as claimed in claim 1, wherein the aromatic carbonate is at least one compound selected from the group consisting of unsubstituted catechol carbonate and substituted catechol carbonate having at least one $C_1$-$C_4$ alkyl group.

* * * * *